H. R. JOHNSTONE.
BUTT REST FOR A FISHING ROD.
APPLICATION FILED OCT. 10, 1916.

1,223,884.　　　　　　　　　　　　　　Patented Apr. 24, 1917.

Witness:
W. M. Gentle,

Inventor.
Hugo R. Johnstone
By
Attorney.

UNITED STATES PATENT OFFICE.

HUGO R. JOHNSTONE, OF PASADENA, CALIFORNIA.

BUTT-REST FOR A FISHING-ROD.

1,223,884.  Specification of Letters Patent.  Patented Apr. 24, 1917.

Application filed October 10, 1916. Serial No. 124,914.

*To all whom it may concern:*

Be it known that I, HUGO R. JOHNSTONE, a citizen of the United States of America, residing at Pasadena, county of Los Angeles, State of California, have invented a certain new and useful Butt-Rest for a Fishing-Rod; and I do hereby declare the following to be a full, clear, and exact description of the invention, such as will enable others skilled in the art to which it appertains to make and use the same.

This invention relates to a novel and improved butt-rest for fishing rods; and it may be said to consist in the provision of the novel and advantageous features and in the novel and improved construction, arrangement, and combination of parts and devices as will be apparent from the description and claims which follow hereinafter.

The main object of the invention is to provide a novel and improved rest for the butt of a rod used to catch large and heavy fishes; said rest being adapted for removable attachment to the seat of a boat, and designed to hold the rod so that the reel is easily kept in such a position in front of the angler that it can conveniently be manipulated even when the boat rolls or pitches.

A further object of the invention is to provide a novel and improved butt-rest in which a socket is arranged on a gimbal mounting; said socket being formed so that the butt of the rod can be easily and quickly placed therein in the proper position, and said butt and socket being constructed to prevent relative movement when the butt is inserted in the socket.

A further object of the invention is to provide a novel and improved construction in which the gimbal mounting for the socket is pivotally mounted, but can be locked to prevent rotation when desired.

Figure 1:
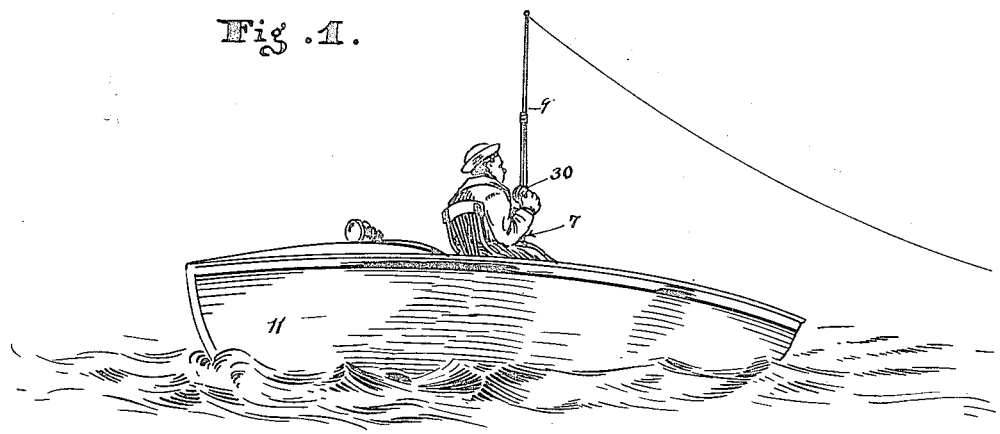
Figure 2:
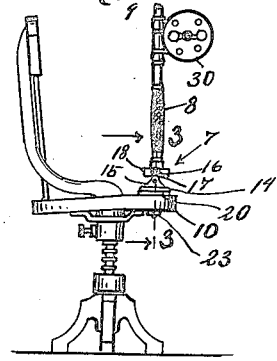
Figure 3:
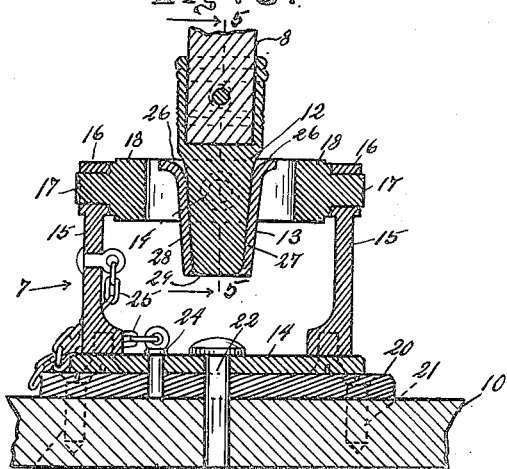
Figure 4:
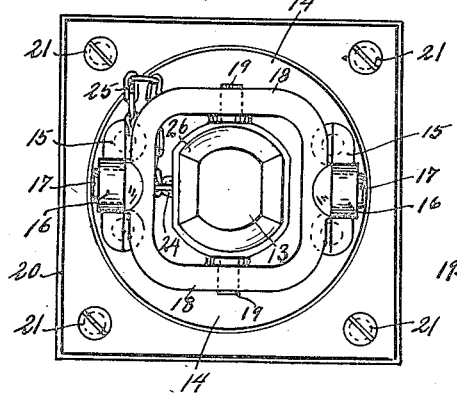
Figure 5:
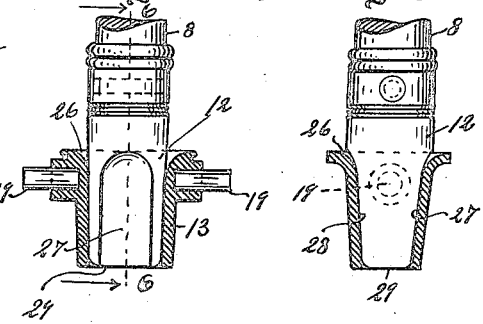
Figure 6:
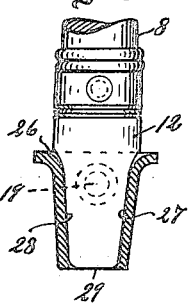

Other objects and the advantages of the invention will be apparent to those skilled in the art from a careful consideration of the following description of the preferred form of construction embodying the invention, taken in connection with the accompanying drawings in which Figure 1 is a general view of the invention in use; Fig. 2 is a broken view showing the butt-rest attached to the seat; Fig. 3 is an enlarged broken sectional view taken on the line 3—3 of Fig. 2; Fig. 4 is a plan view of the butt-rest, with the butt removed from the socket; Fig. 5 is a broken sectional view showing the butt inserted in the socket; and Fig. 6 is a sectional view taken on the line 6—6 of Fig. 5.

The rest 7 for the butt 8 of the fishing rod 9 is mounted on the forward part of a preferably swiveled seat 10 in a boat 11. The end of butt 8 is provided with a part 12 adapted to fit removably in a socket 13 which is arranged on a gimbal mounting which latter is preferably removably attached to the seat 10.

The gimbal mounting preferably consists of a base 14 having thereon the spaced oppositely disposed posts 15 which are provided at their upper end with bearings 16 for the pivots 17 on the gimbal ring 18 which latter is provided with openings in which are rotatably fitted at right angles to the pivots 15 the oppositely disposed pivots 19 which are provided on the socket 13.

A bearing plate 20 is preferably affixed to the seat 10 by means of the screws 21. The gimbal mounting is preferably removably and rotatably mounted on the bearing plate 20 by means of the bolt 22 which passes through the base 14, the bearing plate 20, and the seat 10, and has thereon the nut 23. If desired the gimbal mounting can be locked to prevent rotation thereof by means of the pin 24 which is placed in openings provided in the base 14 and bearing plate 20, and is preferably connected to one of the posts 15 by the chain 25.

The socket 13 is provided with a flaring mouth 26, and the part 12 which fits in the socket 13 tapers slightly downwardly and has two opposite sides 27 and 28 flattened. The end 29 of the part 12 has its edge slightly chamfered and it is flat and of a comparatively large area to lessen the intensity of its pressure when in contact with the body of the angler should the latter play a large fish and not insert the rod 9 in the butt-rest. The flaring mouth 26 permits of the butt 8 being easily and quickly inserted in the socket 13, and the flattened sides 27 and 28 in contact with corresponding faces in the socket 13 prevent any turning movement of the butt 8 in the socket 13 and insure the proper placing of the rod 9 in the butt-rest so that the reel 30 is disposed in the right position for manipulation by the angler. The gimbal mounting for the socket 13 permits of the rod 9 being easily kept in a convenient position for manipulation of the reel 30 even though the boat is rocked or tossed about by a heavy sea. The pivotal mounting of the butt-rest permits the latter to turn so that the rod 9 can take the most convenient position for manipulation of the reel 30 in playing a large fish at any angle to the boat 11.

The construction which has been particularly illustrated and described admits of minor changes and modifications—wherefore the right is reserved to all such changes and modifications as do not depart from the spirit and scope of the invention which is defined in the appended claims.

I claim:—

1. A butt-rest for a fishing rod, comprising a pivot, a base connected to the pivot, a gimbal ring pivotally mounted on the base, and a socket pivotally mounted on the gimbal ring as set forth.

2. A butt-rest for a fishing rod, comprising a bearing plate, a base pivotally mounted on the bearing plate, a gimbal ring pivotally mounted on the base, and a socket pivotally mounted on the gimbal ring as set forth.

3. The combination of a pivot, a base connected to the pivot, a gimbal ring pivotally mounted on the base, and a socket pivotally mounted on the gimbal ring and provided with a flaring mouth, said part being tapered and having flattened sides substantially as and for the purpose set forth.

4. The combination with a seat, of a bearing plate on the seat, a base pivotally and removably mounted on the bearing plate, a gimbal ring pivotally mounted on the base, and a socket pivotally mounted on the gimbal ring and provided with a flaring mouth.

5. The combination with a seat, of a bearing plate on the seat, a base pivotally mounted on the bearing plate, a gimbal ring pivotally mounted on the base, a socket pivotally mounted on the gimbal ring and provided with a flaring mouth, said part being tapered and having flattened sides as set forth, and means to lock the base against rotating on the bearing plate at will.

In testimony whereof, I have signed my name to this specification at Los Angeles, county of Los Angeles, State of California, this 4th day of October A. D. 1916.

HUGO R. JOHNSTONE.